(12) United States Patent
Schleif et al.

(10) Patent No.: US 9,777,589 B2
(45) Date of Patent: Oct. 3, 2017

(54) SYSTEM FOR ROUTING ROTATABLE WIRE BUNDLES OF TURBOMACHINE

(71) Applicant: General Electric Company, Schenectady, NY (US)

(72) Inventors: Kurt Kramer Schleif, Greenville, SC (US); Donald W. Shaw, Simpsonville, SC (US); Zachary John Snider, Simpsonville, SC (US); Mario Joseph Arceneaux, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 509 days.

(21) Appl. No.: 14/522,622

(22) Filed: Oct. 24, 2014

(65) Prior Publication Data

US 2016/0118781 A1 Apr. 28, 2016

(51) Int. Cl.
| | | |
|---|---|---|
| H02G 1/08 | (2006.01) |
| F01D 17/06 | (2006.01) |
| F01D 17/08 | (2006.01) |
| F01D 21/00 | (2006.01) |
| F03D 17/00 | (2016.01) |
| F03D 80/80 | (2016.01) |
| F03D 80/00 | (2016.01) |

(52) U.S. Cl.
CPC .......... *F01D 21/003* (2013.01); *F01D 17/06* (2013.01); *F01D 17/08* (2013.01); *F01D 17/085* (2013.01); *F03D 17/00* (2016.05); *F03D 80/00* (2016.05); *F03D 80/85* (2016.05); *H02G 1/08* (2013.01); *F05D 2220/30* (2013.01); *F05D 2240/60* (2013.01); *F05D 2260/83* (2013.01)

(58) Field of Classification Search
CPC ........ F01D 21/003; F01D 17/02; F01D 17/08; F01D 17/085; F01D 17/06; H02G 1/08; F05D 2260/83; F05D 2240/60; F05D 2240/61; F05D 2220/30; F05B 2260/83; F05B 2240/60; F05B 2240/61; F04D 27/001; F03D 17/00; F03D 80/00; F03D 80/85
USPC ........................................... 415/118; 416/61
See application file for complete search history.

(56) References Cited

U.S. PATENT DOCUMENTS

| | | | |
|---|---|---|---|
| 2008/0207389 A1* | 8/2008 | Fahrenbach | .......... F16H 37/065 475/344 |
| 2009/0179428 A1* | 7/2009 | Achenbach | ............. F03D 15/00 290/55 |
| 2010/0007144 A1* | 1/2010 | Nigam | .................... F03D 3/005 290/44 |
| 2010/0021309 A1* | 1/2010 | Hennig | .................. H02K 5/225 416/244 R |

(Continued)

*Primary Examiner* — Christopher Verdier
(74) *Attorney, Agent, or Firm* — Dority & Manning, PA

(57) ABSTRACT

A system for routing rotatable wire bundles which extend from a rotor shaft of a turbomachine includes a plurality of wire bundles which extend outwardly from an inner passage of the rotor shaft of the turbomachine. An annular wire barrel is coupled to an end of the rotor shaft. A plurality of thru-holes is defined within and/or by the wire barrel. The plurality of thru-holes is annularly arranged therein. Each thru-hole extends through an aft wall of the wire barrel and is circumferentially spaced from adjacent thru-holes. Each wire bundle extends individually through a corresponding thru-hole of the plurality of thru-holes.

18 Claims, 5 Drawing Sheets

(56) References Cited

U.S. PATENT DOCUMENTS

2012/0116723 A1* 5/2012 Shaw .................... H01R 39/08
                                                                     702/188

* cited by examiner

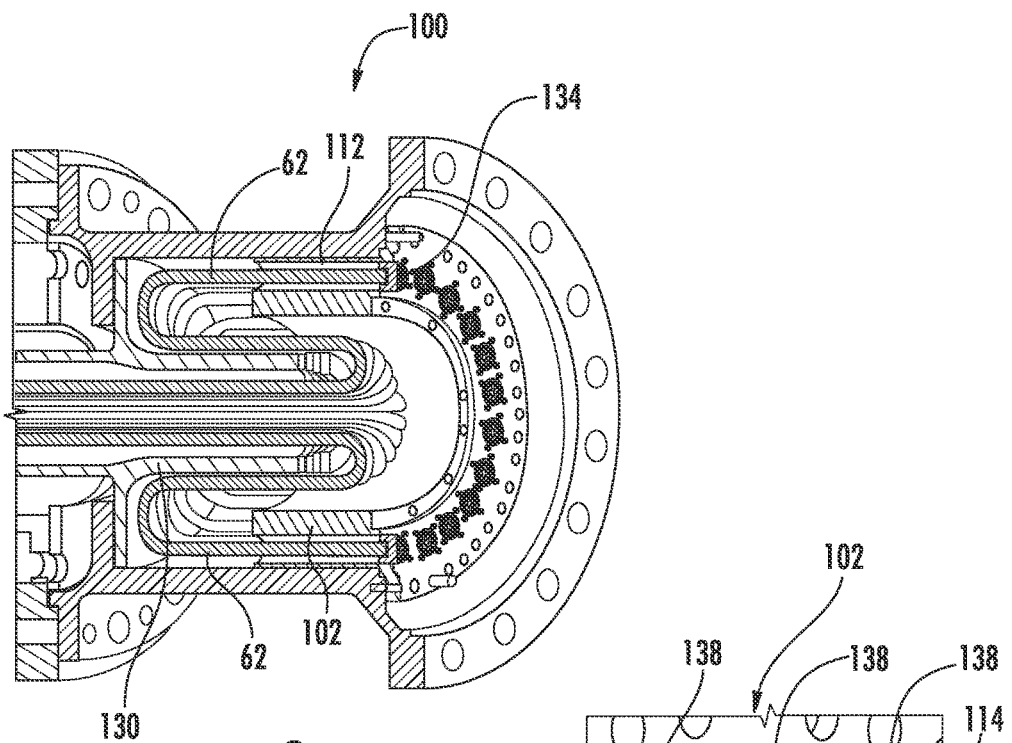
FIG. 8
FIG. 9
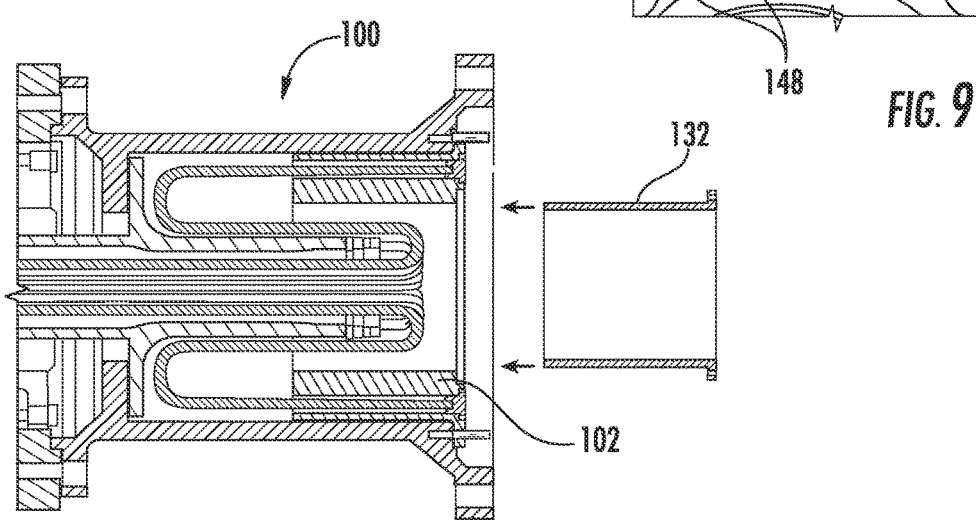
FIG. 10

SYSTEM FOR ROUTING ROTATABLE WIRE BUNDLES OF TURBOMACHINE

FIELD OF THE INVENTION

The present invention generally involves a turbomachine having a plurality of wire bundles coupled at one end to various rotatable sensors which are disposed within the turbomachine. More specifically, the present invention involves a system for routing the wire bundles out of the turbomachine for connection to a slip ring, data processor, controller or the like.

BACKGROUND OF THE INVENTION

Turbomachines such as wind turbines, gas turbines, steam turbines, pumps, fans, generators, motors, and other forms of commercial equipment frequently include shafts, blades, and other rotating components. It is known in the art to install one or more sensors on the rotating components to measure various characteristics of those components in order to control, monitor, and/or enhance the operation of the rotating components. For example, sensors that measure temperature, velocity, stress, strain, vibrations, and/or other characteristics of the rotating components may allow for early detection of abnormalities, adjustments to repair or maintenance schedules, and/or other actions to enhance operations.

The sensors may be electronically coupled to a controller or data processing device via one or more wire bundles which extend through an inner passage defined within the rotor shaft. The wire bundles rotate with the rotor shaft during operation of the turbomachine. Various slip ring and telemetry systems are known in the art for transmitting the sensor data from the rotating components to stator components for further analysis. In many cases, the number of sensors and corresponding wires may number in the hundreds or thousands.

Conventionally, the multitude of wires in the wire bundle(s) are manually fixed or connected to a single or common printed circuit board commonly known as a tack board. Although this configuration and connection method has high reliability, it can be tedious, non-serviceable, and non-repairable, can be difficult to mate to other components and typically limits the number of sensors which may be used. In addition, the wire bundle(s) are generally subjected to g-loads which may impact the integrity of the connections and or the individual wires within the wire bundle(s). Therefore, an improved system for routing the wires out of the rotor shaft for connection to the controller, data processor or the like would be useful.

BRIEF DESCRIPTION OF THE INVENTION

Aspects and advantages of the invention are set forth below in the following description, or may be obvious from the description, or may be learned through practice of the invention.

One embodiment of the present invention is a system for routing rotatable wire bundles which extend from a rotor shaft of a turbomachine. The system includes a plurality of wire bundles which extend outwardly from an inner passage of the rotor shaft of the turbomachine. An annular wire barrel is coupled to an end of the rotor shaft. A plurality of thru-holes is defined within and/or by the wire barrel. The plurality of thru-holes is annularly arranged therein. Each thru-hole extends through an aft wall of the wire barrel and is circumferentially spaced from adjacent thru-holes. Each wire bundle extends individually through a corresponding thru-hole of the plurality of thru-holes.

Another embodiment of the present invention is a turbomachine. The turbomachine includes an annular rotor shaft which extends along an axial centerline of the turbomachine. The rotor shaft defines an inner passage which extends therethrough. The turbomachine further includes a plurality of sensors where each sensor is coupled to a rotatable component which is coupled to the rotor shaft. A plurality of wire bundles extend through the rotor shaft inner passage and out of one end of the rotor shaft. Each wire bundle comprises a plurality of wires with each wire coupled to one sensor of the plurality of sensors. An annularly shaped wire barrel is coaxially aligned with and coupled to the end of the rotor shaft. A plurality of thru-holes is defined within the wire barrel. The plurality of thru-holes is annularly arranged therein. Each of the thru-holes extends substantially axially through a forward wall and an aft wall of the wire barrel and is circumferentially spaced from adjacent thru-holes. Each wire bundle extends individually through a corresponding thru-hole of the plurality of thru-holes.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 8 is an exploded view of a portion of the system as shown in FIG. 3, according to various embodiments of the present invention;

FIG. 9 is an exploded view of a portion of the system as shown in FIG. 3, according to various embodiments of the present invention; and FIG. 10 is an exploded view of a portion of the system as shown in FIG. 3, according to various embodiments of the present invention.

DETAILED DESCRIPTION OF THE INVENTION

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a gas turbine for purposes of illustration, one of ordinary skill in the art will readily appreciate that embodiments of the present invention may be applied to any turbomachine such as a steam turbine, a wind turbine, a fan or the like which includes multiple wire bundles which extend out from a rotating shaft and the specification is not intended to be limited to a gas turbine turbomachine unless otherwise specified in the claims.

The invention, as illustrated and disclosed herein, provides a system for routing multiple wire bundles from a rotor shaft of a turbomachine for connection to a stationary component of a slip ring, a computer, a data processor or the like. The system generally provides a means to manage many wires in a very small space, thus reducing component size and increasing a number of sensors that may be utilized. The system permits slack in the wire bundles which allows for maintenance and repair. The system generally facilitates larger wire/sensor handling capability. As a result, an increase in instrumentation count for validation testing may be realized, which in turn may provide greater data to the Engineering community. The system may provide radial support for the wire bundles under g-load, thus improving connection reliability. The system may further prevent kinking of the wire bundles and/or prevent entanglement of the bundles during assembly.

Figure 1:
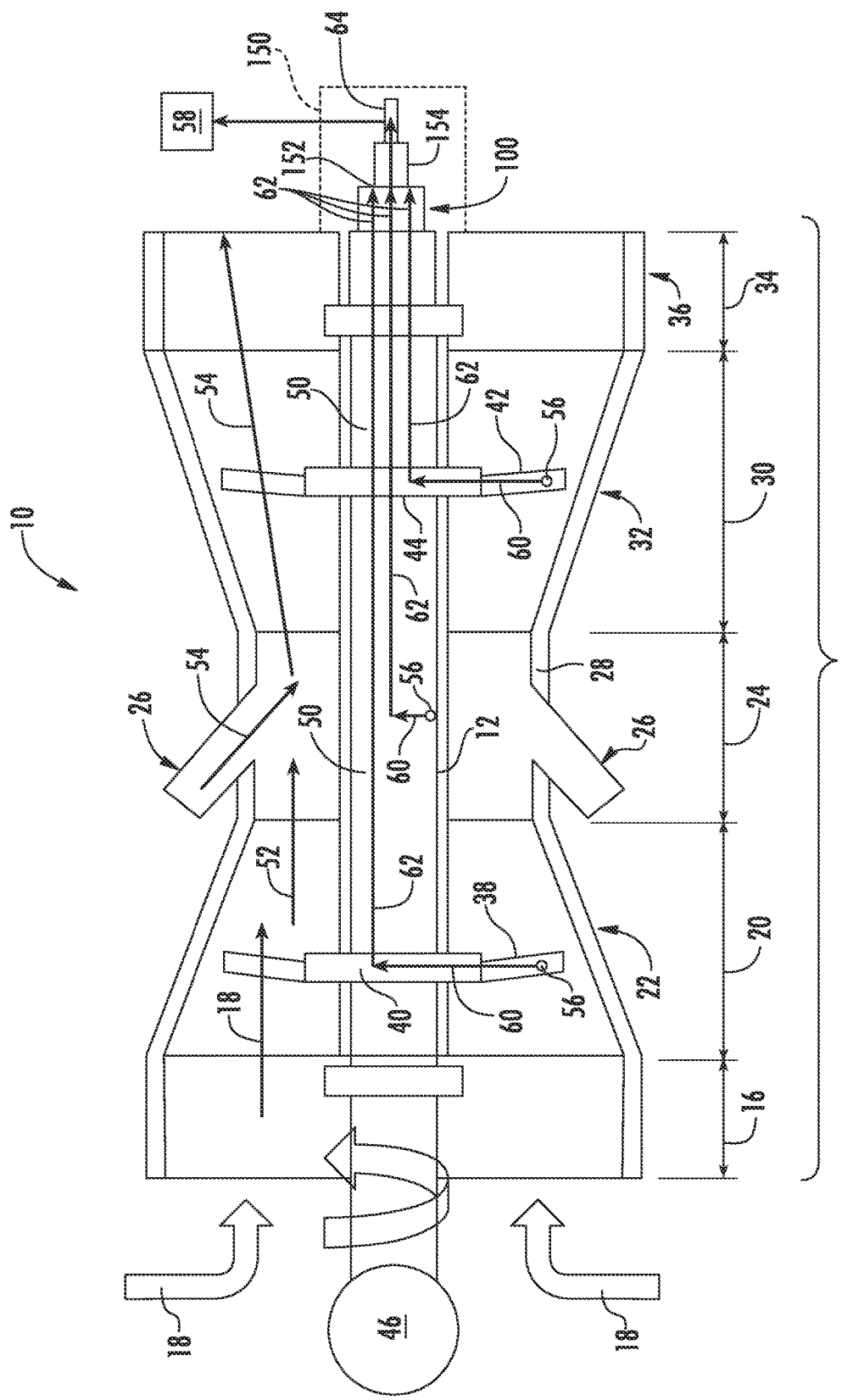
FIG. 1 is a functional block diagram of an exemplary turbomachine having a rotor shaft which extends along an axial centerline of the turbomachine as may be incorporated into various embodiments of the present invention.

Referring now to the drawings, wherein identical numerals indicate the same elements throughout the figures, FIG. 1 provides a functional block diagram of an exemplary turbomachine 10 having a rotor shaft 12 which extends along an axial centerline of the turbomachine 10. In particular embodiments, as shown in FIG. 1 the turbomachine 10 is a gas turbine 14. As shown in FIG. 1, the gas turbine 14 generally includes an inlet section 16 that may include a series of filters, cooling coils, moisture separators, and/or other devices (not shown) to purify and otherwise condition air 18 entering the gas turbine 14. A compressor section 20 including a compressor 22 is disposed downstream from the inlet section 16. A combustion section 24 is disposed downstream from the compressor section 20 and may include a plurality of combustors 26 annularly arranged around an outer casing 28 such as a compressor discharge casing.

A turbine section 30 including a high and/or low pressure turbine 32 is disposed downstream from the combustion section 24. The gas turbine 14 may also include an exhaust section 34 which includes an exhaust duct or diffuser 36 which is disposed downstream from an outlet of the turbine 32. In particular embodiments, the inlet section 16, compressor 22, the combustion section 24, turbine 32 and the exhaust duct 36 define a primary flow passage through the gas turbine 12.

The compressor 20 generally includes multiple rows or stages of compressor blades 38 (only one stage shown) where each row of compressor blades 38 is coupled to the rotor shaft 12 via a compressor rotor disk 40. In addition, the turbine 32 generally includes multiple rows or stages of turbine blades 42 (only one stage shown) where each row of turbine blades is coupled to the rotor shaft 12 via a turbine rotor disk 44. The compressor and turbine blades 38, 42 are generally mounted, angled and/or formed such that rotation of the rotor shaft 12 causes the air 18 to be drawn through the inlet section 16 and into the compressor 22. Although illustrated as counter-clockwise, the rotational direction may be either clockwise or counter-clockwise depending on the configuration of the compressor and turbine blades 38, 42.

The rotor shaft 12 may be connected to a motor and/or a generator 46 in order to turn the rotor shaft 12 and/or to generate electrical power and/or mechanical work. The rotor shaft 12 may be a single shaft or may include multiple shafts coupled together to form a singular shaft through the turbomachine 10 or gas turbine 14. In particular embodiments, the rotor shaft 12 is annularly shaped to form or define an inner passage 50 which extends axially therethrough.

In operation, the air 18 is drawn through the inlet section 16 and into the compressor 22 where it is progressively compressed so as to provide compressed air 52 to the combustion section 24. The compressed air 52 is routed to the combustors 26 where it is mixed with a fuel. The fuel-air mixture in each combustor 26 is burned, thus generating high temperature combustion gases 54 at a high velocity. The combustion gases 54 are routed through the turbine 32 where thermal and kinetic energy are transferred from the combustion gases 54 to the turbine blades 42, thus causing the rotor shaft 12 to rotate. The combustion gases 54 are exhausted through the exhaust duct 36.

During operation of a turbomachine 10 such as the gas turbine 14 described herein, the various rotatable components such as the compressor blades 38, the compressor rotor disks 40, the turbine blades 42, the turbine rotor disks 44, the rotor shaft 12 and various other rotatable turbomachine components are exposed to extreme temperatures as well potentially life limiting mechanical stresses. As a result, it is generally desirable to monitor various operating parameters such as temperature, velocity, stress, strain, vibrations, and/or other characteristics of the rotating components which may allow for early detection of abnormalities, allow for adjustments to repair or maintenance schedules, and/or other actions to enhance operation and/or efficiency of the turbomachine 10.

In order to monitor the various operating parameters at the various rotatable components, sensors 56 may be coupled to or disposed proximate to the various rotatable components within the turbomachine 10. The sensors 56 may comprise pressure detectors, strain gauges, or accelerometers that generate one or more signals reflective of vibrations or movement by the compressor blades 38, turbine blades 42, or other rotating components. In other embodiments, the sensors 56 may comprise thermocouples or resistance temperature detectors that generate one or more signals reflective of the temperature of the various rotating components. One of ordinary skill in the art will readily appreciate that embodiments of the present invention are not limited to any particular sensor type unless specifically recited in the claims.

In particular embodiments, the sensors 56 may be placed on the compressor blades 38, the compressor rotor disks 40, the turbine blades 42, the turbine rotor disks 44, within the inner passage 50 of the rotor shaft 12, etc. . . . Signals are transmitted from the sensors 56 to a data processor 58 which may include a controller or computing device via individual wires 60. Each wire 60 is connected at one end to a corresponding sensor 56. The wires 60 are routed generally axially through the inner passage 50 defined within the rotor shaft 12. Due to the large number of sensors 56 and corresponding wires 60, it may be desirable to bundle the individual wires 60 into multiple wire bundles 62 or cables which extend within the inner passage 50 of the rotor shaft 12.

The sensors 56 and wire bundles 62 rotate with the rotor shaft 12. Therefore, it is necessary to electronically couple a terminating end of each wire bundle 62 to a slip ring 64 or other device which allows for transmission of the signals from the rotating components to the data processor 58.

Figure 2:
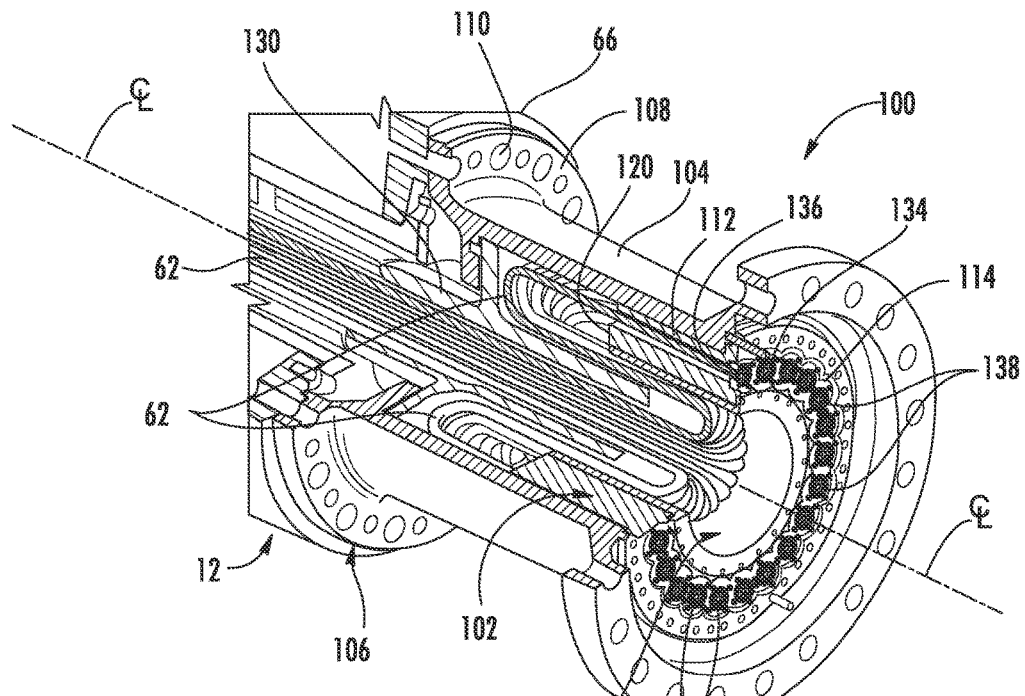
FIG. 2 is a partial cut away perspective view of a system for routing multiple wire bundles out of a rotor shaft of a turbomachine according to various embodiments of the present invention.
Figure 3:
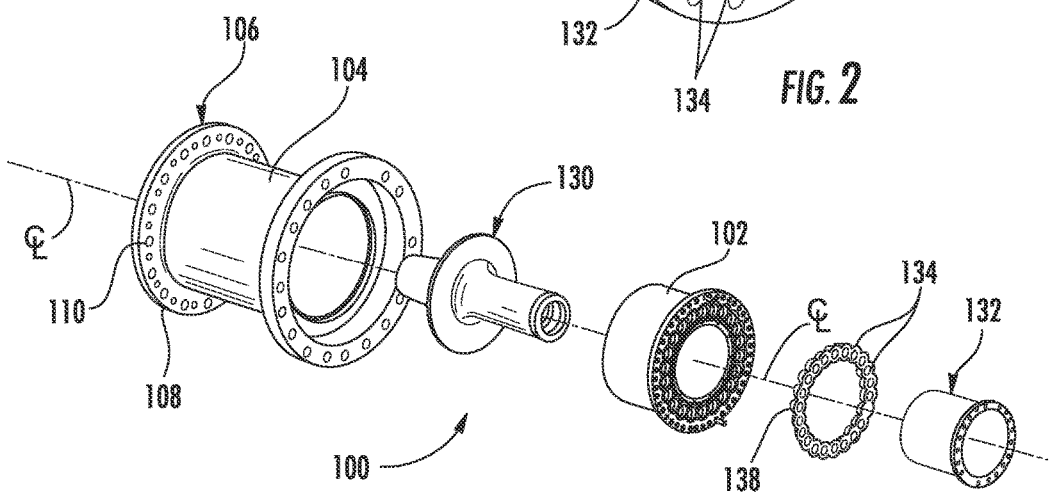
FIG. 3 is an exploded view of various components of the system as shown in FIG. 2, according to various embodiments of the present invention.

FIG. 2 provides a partial cut away perspective view of a system 100 for routing multiple wire bundles 62 out of the rotor shaft 12 of the turbomachine 10, herein referred to as "system", for connection to the slip ring 64 or other stationary device. FIG. 3 provides an exploded view of various components of the system 100 according to various embodiments of the present invention.

In various embodiments, as shown in FIGS. 2 and 3 collectively, the system 100 may include an annular wire barrel 102 which is coupled to an end portion 66 (FIG. 2) of the rotor shaft 12. In particular embodiments, as shown in FIG. 2, the wire barrel 102 may be coupled to the end portion 66 (FIG. 2) of the rotor shaft 12 via an annular extension shaft 104 (FIGS. 2 and 3). The extension shaft 104 is coaxially aligned with the rotor shaft 12 and the wire barrel 102.

As shown in FIGS. 2 and 3, the extension shaft 104 may be configured to connect at a first end 106 to the rotor shaft 12. For example, the extension shaft 104 may include a flange portion 108 which extends radially outwardly and at least partially circumferentially around the first end 106 of the extension shaft 104. The flange 108 may define a plurality of fastener holes 110 for bolting or otherwise connecting the extension shaft 104 to the end portion 66 of the rotor shaft 12. In alternate embodiments, the extension shaft 104 may be welded or otherwise fixedly connected to the rotor shaft 12.

Figure 4:
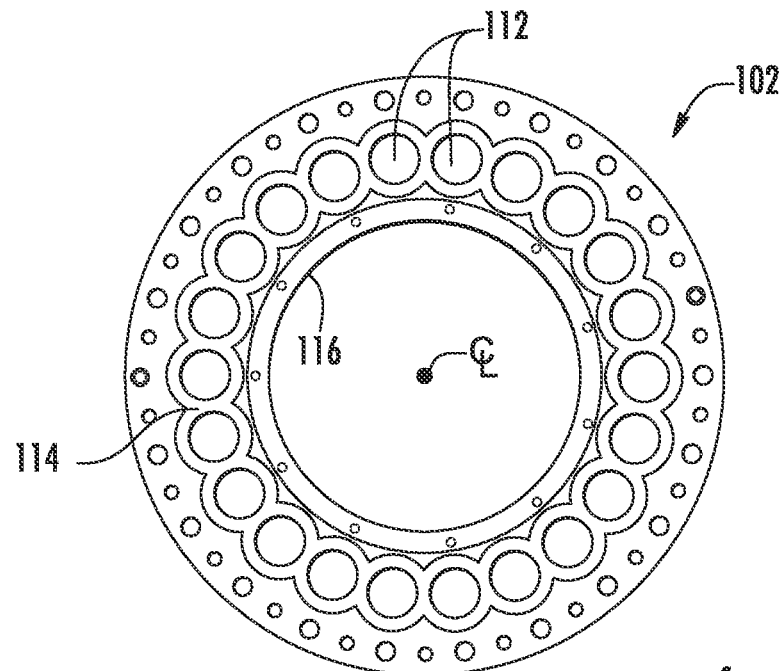
FIG. 4 is an enlarged from view of an exemplary wire barrel of the system as shown in FIG. 3, according to various embodiments of the present invention.
Figure 5:
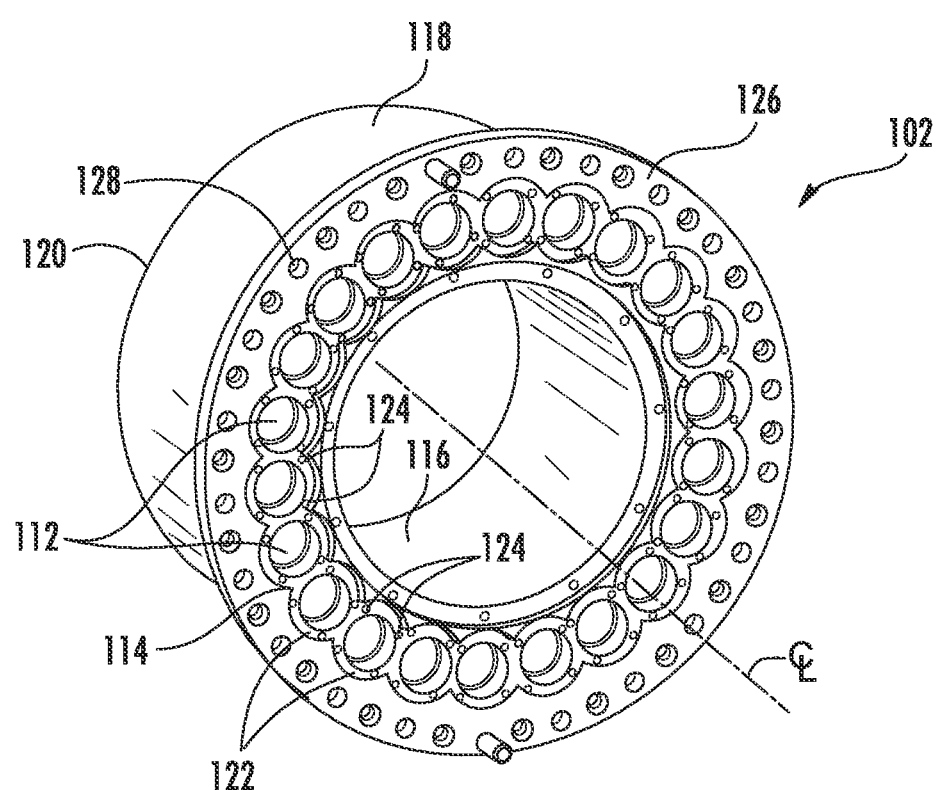
FIG. 5 is a perspective view of the wire barrel as shown in FIG. 4, according to various embodiments of the present invention.

FIG. 4 provides an enlarged view of the wire barrel 102 according to various embodiments of the present invention. FIG. 5 provides a perspective view of the wire barrel 102 as shown in FIG. 4. As shown in FIGS. 4 and 5, the wire barrel 102 includes a plurality of thru-holes 112. The thru-holes 112 may be defined within and/or by the wire barrel 102. In particular embodiments, as illustrated in FIGS. 4 and 5, each thru-hole 112 extends through an aft wall 114 of the wire barrel 102 between an inner side 116 and an outer side 118 of the wire barrel 102. In particular embodiments, as shown in FIG. 2, the thru-holes 112 extend through a forward wall 120 and the aft wall 114 of the wire barrel 102.

As illustrated in FIG. 4, the plurality of thru-holes 112 is annularly arranged within the wire barrel 102 with respect to an axial centerline of the wire barrel 102, such that each thru-hole 112 is circumferentially spaced from adjacent thru-holes 112. In particular embodiments, as illustrated in FIG. 5, the aft wall 114 is recessed or defines a recessed portion 122 around each thru-hole 112. One or more threaded holes 124 may be circumferentially spaced around each or at least some of the thru-holes 112 along the aft wall 114. The threaded holes 124 may be formed within the recessed portions 122 of the aft wall 114.

In particular embodiments, the wire barrel 102 is configured to connect or couple to the extension shaft 104. For example, as shown in FIG. 5, the wire barrel 102 may include a flange portion 126 which extends radially outwardly from the thru-holes 112. A plurality of axially oriented holes 128 may be defined in the flange portion 126 for receiving a fastener and/or alignment pin for connecting and/or aligning the wire barrel to the extension shaft 104.

In particular embodiments, as shown in FIGS. 2 and 3 the system 100 includes an annular shaped swage seal 130. The swage seal 130 may be coupled to the end portion 66 of the rotor shaft 12 directly, or as illustrated in FIG. 2, may be coupled via the extension shaft 104. The swage seal 130 is substantially coaxially aligned with the rotor shaft 12, the wire barrel 102 and/or the extension shaft 104. The swage seal 130 is generally sized to extend axially within the extension shaft 104 and at least partially axially through the wire barrel 102. The swage seal 130 may prevent or restrict cooling air from flowing out of the inner passage 50 (FIG. 1) of the rotor shaft 12.

In particular embodiments, as illustrated in FIGS. 2 and 3, the system 100 may include an annular inner sleeve 132. The inner sleeve 132 is generally formed to be seated within the wire barrel 102. The inner sleeve 132 may be fixedly connected to the wire barrel 102 via various mechanical fasteners such as bolts or the like and/or may be press fit into the wire barrel 102. The inner sleeve 132 may also be formed to allow the swage seal 130 to extend at least partially axially therethrough.

In various embodiments, as shown in FIGS. 2 and 3, the system 100 further includes a plurality of connectors 134. As shown in FIG. 2, each connector 134 is connected to a terminal end 136 of a corresponding wire bundle 62. Each connector 134 is sized so as to extend at least partially inside a corresponding thru-hole 112 of the wire barrel 102. In particular embodiments, the system 100 includes a plurality of retention collars 138. The retention collars 138 are configured to at least partially circumferentially surround a corresponding thru-hole 112 along the aft wall 114 of the wire barrel. In particular embodiments, the retention collars 138 are formed to fit within the recessed portion 122 (FIG. 5) of the aft wall 114. The retention collars 138 may be held in position via mechanical fasteners such as bolts or the like. The retention collars 138 may serve to hold the connectors 134 into position within the corresponding thru-holes 112.

Figure 6:
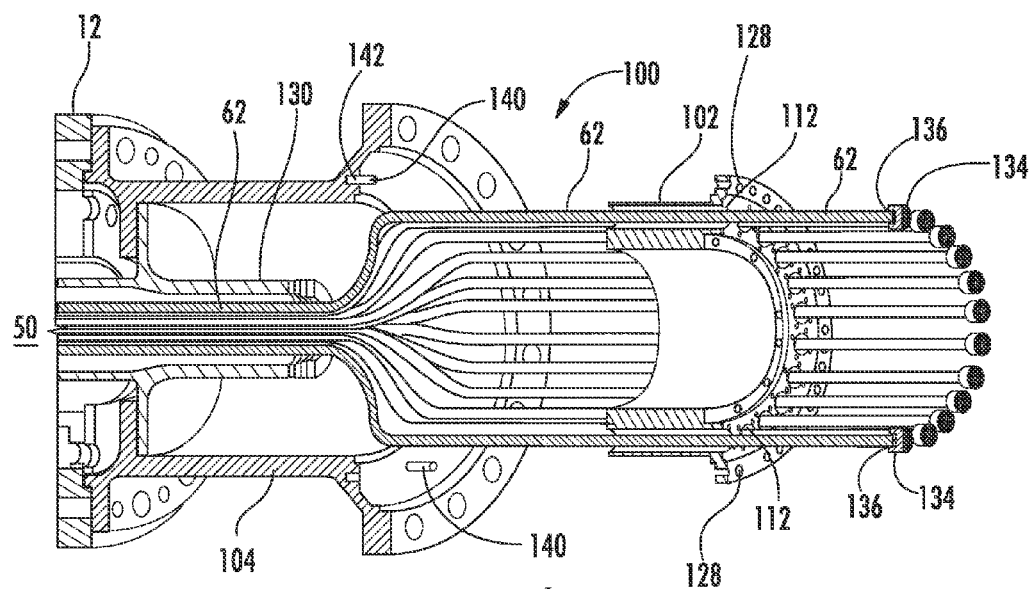
FIG. 6 is an exploded view of a portion of the system as shown in FIG. 3, according to various embodiments of the present invention.

FIGS. 6, 7, 8, 9 and 10 illustrate the system 100 at various assembly stages according to various embodiments of the present invention. For example, as shown in FIG. 6, each wire bundle 62 may be routed through a corresponding thru-hole 112 of the wire barrel 102. In particular embodiments, the wire bundles 62 may be routed from the inner passage 50 of the rotor shaft 12 through the swage seal 130 before being routed through the thru-holes 112 of the wire barrel 102. The terminal end 136 of each wire bundle 62 may be coupled to a corresponding connector 134. One or more alignment pins 140 may be inserted into corresponding holes 142 defined within the extension shaft 104. The alignment pins 140 and/or holes 142 are formed so as to coaxially align with a corresponding hole 128 of the wire barrel 102.

Figure 7:
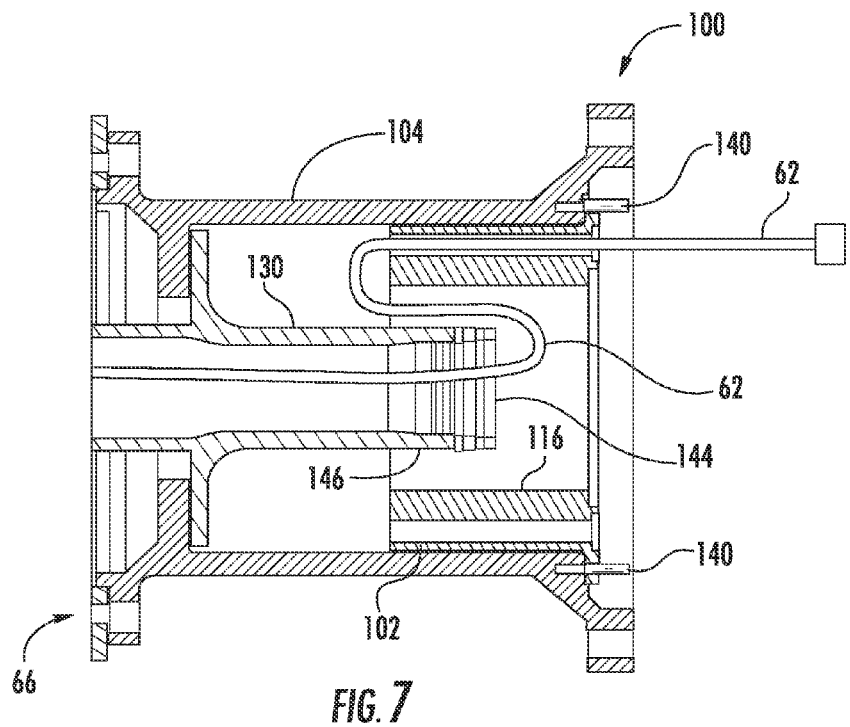
FIG. 7 is an exploded view of a portion of the system as shown in FIG. 3, according to various embodiments of the present invention.

As shown in FIG. 7, the wire barrel 102 may be inserted or guided into the extension shaft 104. The alignment pins 140 may be used to ensure proper alignment of the wire barrel 102 within the extension shaft 104 and/or to prevent entanglement or twisting of the individual wire bundles 62. In particular embodiments, as shown in FIG. 7, each wire bundle 62 will exit an end 144 of the swage seal 130, bend back so as to extend in an opposite or opposing axial direction towards the end portion 66 of the rotor 12. The wire bundle 62 extends between an outer surface 146 of the swage seal 130 and the inner side 116 of the wire barrel 102.

As shown in FIG. 8, each wire bundle 62 may then be slid into its corresponding thru-hole 112 such that the connector 134 is at least partially inserted into the thru-hole 112. As shown, each wire bundle 62 will rest between the swage seal 130 and the wire barrel 102 without crimping. As shown in FIG. 9, the retention collars 138 may be fixed or connected to the aft wall 114 of the wire barrel 102 via mechanical fasteners 148 such as bolts, screws or the like, thus securing the connectors 134 to the aft wall 114 of the wire barrel 102. Each retention collar 138 may at least partially circumferentially surround a respective connector 134.

As shown in FIG. 10, the inner sleeve 132 may be inserted into the wire barrel 102, thus reducing a radial gap between the swage seal 130 and the wire barrel 102. The inner sleeve 132 may held into position via mechanical fasteners and/or via press or interference fit. As shown in FIG. 2, the inner sleeve 132 may restrict and/or prevent radial movement of the wire bundles 62 which may result due to centrifugal forces which may act on the wire bundles during rotation of the rotor shaft 12. As a result, the integrity of the wire connections may be maintained, thus enhancing the performance of the system 100.

In particular embodiments, as illustrated in FIG. 1, the system 100 may be included or integrated as a rotatable component of a slip ring assembly 150. As shown in FIG. 2, the extension shaft 104 may be coupled at one end 106 to the end portion 66 of the rotor shaft 12 and as shown in FIG. 1, at a second end 152 to a rotatable portion 154 of the slip ring assembly 150 and/or to the stator 64 of the slip ring assembly 150. Each connector 134 may be connected to a complementary connector (not shown) of the rotatable portion 154 of the slip ring assembly 150.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for routing rotatable wire bundles extending from a rotor shaft of a turbomachine, comprising:
   a plurality of wire bundles which extend outwardly from an inner passage of the rotor shaft;
   an annular wire barrel coupled to an end of the rotor shaft;
   an annular shaped swage seal coupled to the end of the rotor shaft and extending at least partially through the wire barrel, the swage seal coaxially aligned with the rotor shaft and the wire barrel, the plurality of wire bundles extending through the swage seal towards the wire barrel; and
   a plurality of thru-holes defined within the wire barrel, the plurality of thru-holes being annularly arranged therein, wherein each thru-hole extends through an aft wall of the wire barrel and is circumferentially spaced from adjacent thru-holes;
   wherein each wire bundle extends individually through a corresponding thru-hole of the plurality of thru-holes.

2. The system as in claim 1, further comprising a plurality of connectors, wherein each connector is connected to a terminal end of a corresponding wire bundle.

3. The system as in claim 2, wherein each connector is sized to extend at least partially inside the corresponding thru-hole of the wire barrel.

4. The system as in claim 1, further comprising a plurality of connector retention collars, wherein each connector retention collar is configured to circumferentially surround a corresponding thru-hole along the aft wall.

5. The system as in claim 1, wherein the aft wall includes a recessed portion defined around each thru-hole.

6. The system as in claim 1, further comprising an annular extension shaft coaxially aligned with the rotor shaft and the wire barrel, wherein the extension shaft is configured to connect at a first end to the rotor shaft, wherein the wire barrel is coupled to the rotor shaft via the annular extension shaft.

7. The system as in claim 1, further comprising an annular inner sleeve seated within the wire barrel, wherein the inner sleeve extends circumferentially around a portion of each wire bundle.

8. The system as in claim 1, wherein each thru-hole extends substantially axially through a forward wall and the aft wall of the wire barrel.

9. The system as in claim 1, wherein each wire bundle comprises a plurality of wires, each wire being coupled to a corresponding sensor, wherein the sensor is connected to a rotatable component of the turbomachine.

10. A turbomachine, comprising:
    an annular rotor shaft which extends along an axial centerline of the turbomachine, the rotor shaft defining an inner passage therethrough;
    a plurality of sensors, each sensor coupled to a rotatable component coupled to the rotor shaft;
    a plurality of wire bundles, each wire bundle comprising a plurality of wires, each wire coupled to a corresponding one sensor of the plurality of sensors, wherein the wire bundles extend through the rotor shaft inner passage and out of one end of the rotor shaft;
    an annularly shaped wire barrel coaxially aligned with and coupled to the end of the rotor shaft;
    a plurality of thru-holes defined within the wire barrel, the plurality of thru-holes being annularly arranged therein, wherein each of the thru-holes extends substantially axially through a forward wall and an aft wall of the wire barrel and is circumferentially spaced from adjacent thru-holes; and
    an annular shaped swage seal coupled to the end of the rotor shaft and extending at least partially through the wire barrel, the swage seal coaxially aligned with the rotor shaft and the wire barrel, the plurality of wire bundles extending through the swage seal towards the wire barrel;
    wherein each wire bundle extends individually through a corresponding thru-hole of the plurality of thru-holes.

11. The turbomachine as in claim 10, further comprising an annular extension shaft coaxially aligned with the end of the rotor shaft and the wire barrel, wherein the extension shaft is configured to connect at a first end to the rotor shaft, wherein the wire barrel is coupled to the rotor shaft via the annular extension shaft.

12. The turbomachine as in claim 10, wherein the aft wall includes a recessed portion defined around each thru-hole.

13. The turhomachine as in claim 10, further comprising a plurality of connectors, wherein each connector is connected to a terminal end of a corresponding wire bundle.

14. The turhomachine as in claim 13, wherein each connector is sized to extend at least partially inside the corresponding thru-hole of the wire barrel.

15. The turbomachine as in claim 10, further comprising an annular inner sleeve seated within the wire barrel, wherein the inner sleeve extends circumferentially around a portion of each wire bundle.

16. The turbomachine as in claim 11, further comprising a plurality of connector retention collars, wherein each connector retention collar is configured to circumferentially surround a corresponding thru-hole along the aft wall.

17. The turbomachine as in claim 10, wherein the wire barrel is a rotatable component of a slip ring assembly.

18. The turbomachine as in claim 10, wherein the turbomachine is a gas turbine.

\* \* \* \* \*